United States Patent [19]
Sennik

[11] 4,037,133
[45] July 19, 1977

[54] COMPENSATION OF CATHODE RAY TUBE FOR MOIRE

[75] Inventor: John Joseph Sennik, Kitchener, Canada

[73] Assignee: Electrohome Limited, Kitchener, Canada

[21] Appl. No.: 676,307

[22] Filed: Apr. 12, 1976

[51] Int. Cl.² .......................................... H01J 29/56
[52] U.S. Cl. .............................. 315/31 TV; 315/382; 358/218
[58] Field of Search ................ 315/31 TV, 31 R, 382; 358/218

[56] References Cited

U.S. PATENT DOCUMENTS 3,432,718  3/1969  Preisig ........................... 315/31 TV Primary Examiner—Maynard R. Wilbur
Assistant Examiner—T. M. Blum
Attorney, Agent, or Firm—Sim & McBurney

[57] ABSTRACT

In a video signal receiving apparatus that employs tracking focus moire is eliminated by preventing the DC voltage of the focus electrode from increasing beyond the critical level at which moire will occur.

4 Claims, 2 Drawing Figures

COMPENSATION OF CATHODE RAY TUBE FOR MOIRE

BACKGROUND OF THE INVENTION

This invention relates to a novel technique, system and apparatus for preventing the occurrence of moire on the screen of a cathode ray tube (CRT).

Moire is a shimmering optical effect which will be observed when two similar repetitive structures are aligned at critical angles and exposed to light. The occurrence of moire is a definite problem with a CRT where the repetitive structures are, on the one hand, lines constituted by openings in the shadow mask of the CRT and, on the other hand, lines constituted by the raster scanned by the electron beam of the CRT.

Modern television receivers and monitors employ tracking focus in order to optimize electron beam spot size. More specifically, as the beam current of a CRT varies, it is necessary, in order to maintain proper focus, to correspondingly vary the spot size of the electron beam. Electron optics used in modern CRT's produce optimum spot size at all operating conditions (brightness variations) when the potential of the focus electrode is maintained at between about 18-20% of the potential of the high voltage anode. The maintenance of this condition with beam current variations is the function of the tracking focus network. However, it is this network which also is responsible for moire. More specifically, the function of the tracking focus network is to vary the DC potential of the focus electrode in response to beam current variations, thereby varying electron beam spot size and maintaining the electron beam focused. At some critical point for each cathode ray tube moire will occur when the spot size is reduced to some specific size relative to the aperture spacing (between horizontal lines) of the shadow mask of the CRT. Generally speaking, moire will occur when the ratio of the dimension of a raster line of video information to the aperture spacing of the shadow mask is about 2:1 or less. Thus, if any given CRT is initially properly focused, and tracking focus is employed, the beam current of the CRT can increase to a point where operation of the tracking focus network will result in a spot size small enough to cause moire.

A currently accepted technique to overcome the problem of moire is to defocus the electron beam under all operating conditions. This prevents the spot size from ever becoming so small as to cause moire. Obviously, however, picture resolution is poor because the picture is defocused at all times.

SUMMARY OF THE INVENTION

In accordance with the instant invention moire is eliminated by restricting operation of the tracking focus network over a range within which moire cannot occur and inhibiting the tracking focus network when it would provide a focus electrode voltage, and, hence, spot size, that would result in moire.

In accordance with one aspect of this invention there is provided in a video signal receiving apparatus of a type having a cathode ray tube with a focus electrode, and means for supplying a DC voltage to said focus electrode, said DC voltage varying in response to changes in the beam current of said cathode ray tube in a direction to maintain the electron beam of said cathode ray tube focused, the improvement comprising means responsive to said DC voltage reaching a critical level where a further increase thereof will result in moire for maintaining said DC voltage below said critical level despite any additional changes in said beam current tending to increase said DC voltage above said critical level.

In accordance with another aspect of this invention there is provided in a video signal receiving apparatus of a type having a cathode ray tube with a focus electrode and a dynamic tracking focus network for varying the DC voltage supplied to said focus electrode in response to changes in the beam current of said cathode ray tube in a direction to maintain the electron beam of said cathode ray tube focused, the improvement comprising means for inhibiting operation of said dynamic tracking focus network when said DC voltage is about to exceed a critical value beyond which moire will occur and for keeping said DC voltage below said critical value.

DESCRIPTION OF THE DRAWINGS

This invention will be more apparent from the following detailed description, taken in conjunction with the appended drawings, in which.

DETAILED DESCRIPTION OF THE INVENTION INCLUDING THE PREFERRED EMBODIMENT

Figure 1:
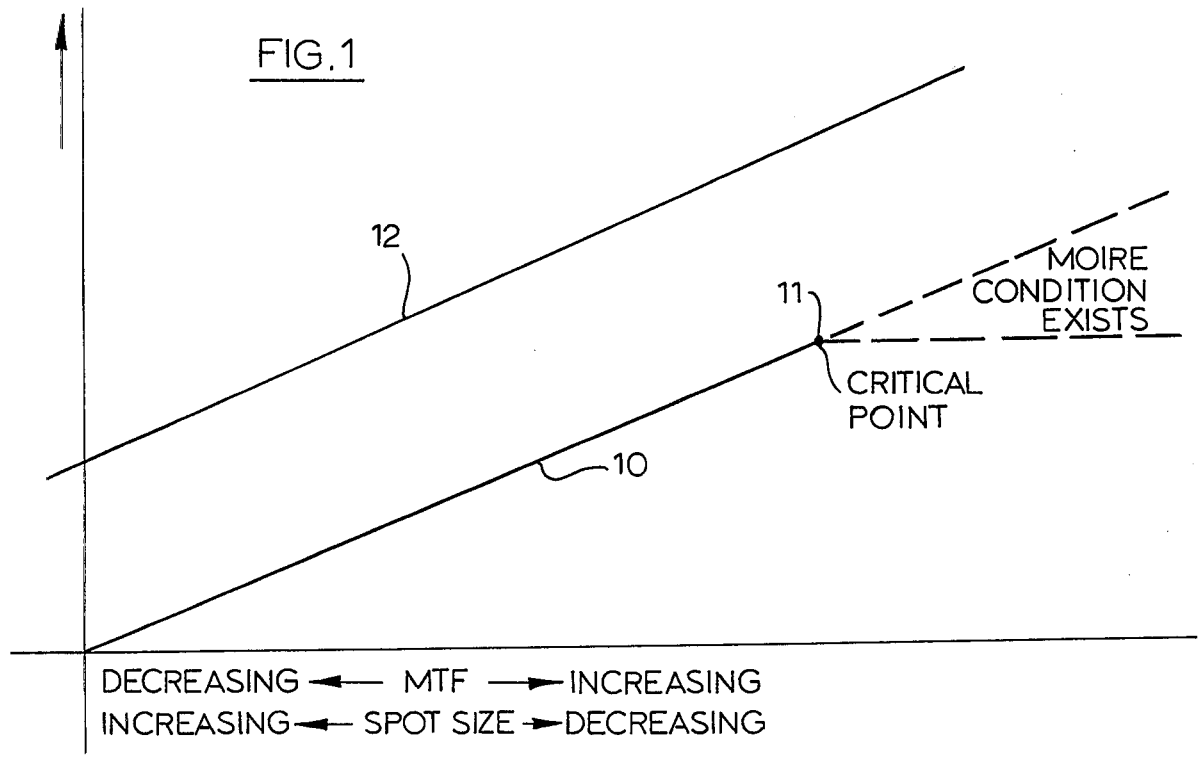
FIG. 1 is a graph useful in explaining the present invention.

FIG. 1 is a graph showing focus electrode voltage plotted against spot size or modulation transfer function (MTF). In this graph the optimum operating conditions from a focus point of view are designated by the line marked 10. In other words, if operation is carried out along the line marked 10, the spot size or MTF will be optimum for each focus electrode voltage. However, if the focus electrode voltage is permitted to exceed the voltage level at the critical point 11, moire will result. In accordance with the instant invention the focus electrode voltage of the CRT simply is not permitted to exceed the voltage at the critical point 11, as will be more apparent hereinafter.

The curve designated 12 in FIG. 1 illustrates current practice where the occurence of moire is prevented by defocusing the electron beam under all conditions. Of course, even with the curve designated 12 it is possible for moire conditions to be achieved but only with focus electrode voltages much greater than would ever be employed in practice.

While, in the preferred embodiment of this invention the operating parameters of the CRT are selected so that below the critical point 11 there is optimum focusing of the electron beam, it should be noted that in less preferred embodiments of the invention it would be possible to permit some defocusing to exist, i.e., to operate on a curve which is intermediate curves 10 and 12, the latter curve also having a critical point 11 but which occurs at a higher voltage level than point 11 on curve 10.

Figure 2:
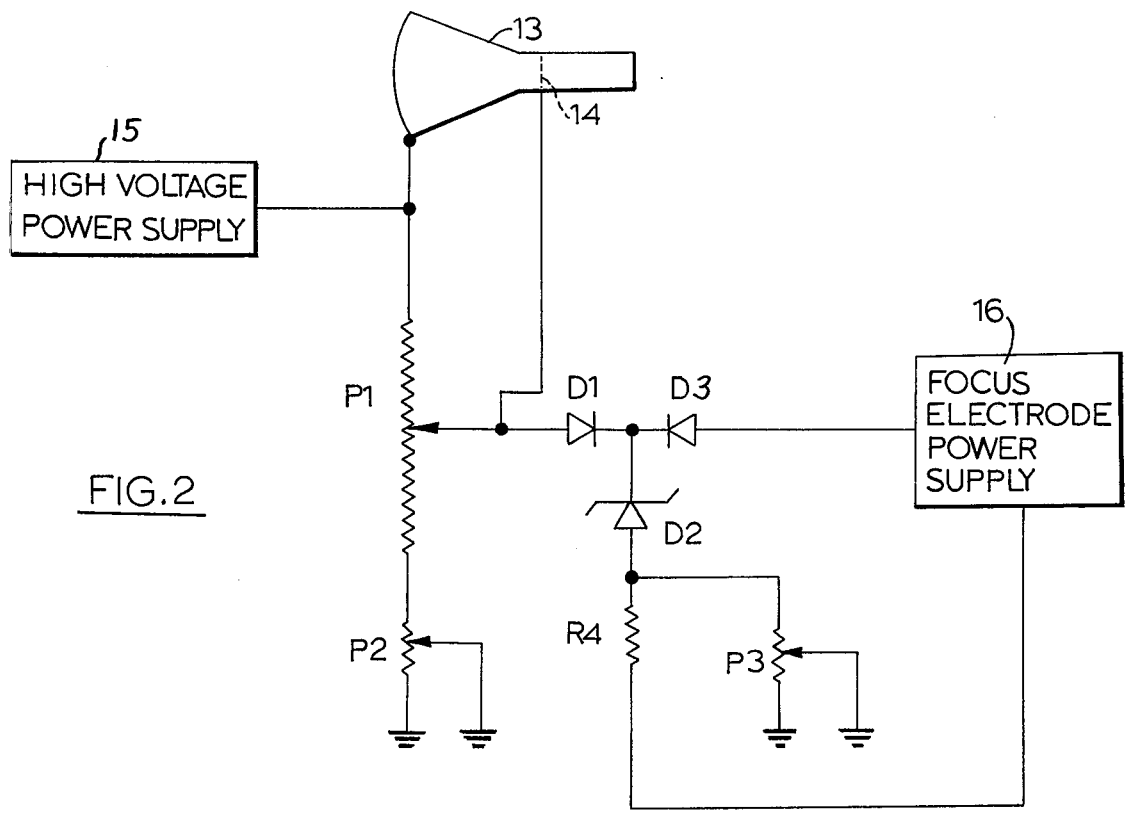
FIG. 2 is a circuit diagram showing one network useful in practising this invention.

Referring now to FIG. 2, there is shown a CRT 13 of any video signal receiving apparatus such as, for eample, a television receiver or monitor. The CRT has a focus electrode 14 and a high voltage anode, the latter being connected to a high voltage power supply 15. High voltage power supply 15 is connected across a voltage divider constituted by potentiometers P1 and P2. These potentiometers constitute a dynamic tracking focus network with the slider of potentiometer P1 being connected to focus electrode 14. The slider of potentiometer P2 is positioned to initially set the DC voltage of focus electrode 14 for the best spot size.

The dynamic tracking focus network operates in a conventional manner. As the beam current of CRT 13 varies, the high voltage of power supply 15 changes because of the relatively high impedance of the power supply. As a consequence, the DC voltage applied to focus electrode 14 varies in response to variations in beam current as desired in order to maintain the electron beam properly focused. More specifically, the slider of potentiometer P2 is set so that curve 10 of FIG. 1 is the curve which is selected for operation, and the focus electrode voltage then varies in response to beam current variations resulting in different optimum electron beam spot sizes for each different value of focus electrode voltage up to the critical point 11.

The slider of potentiometer P1 is connected to the anode of a diode D1 which functions as a voltage sensitive switch. The cathode of diode D1 is connected to a Zener diode D2 which, in turn, is connected via a resistor R4 to a power supply 16 for focus electrode 14. A blocking diode D3 has its cathode connected to the cathode of diode D1 and to Zener diode D2, the anode of blocking diode D3 being connected to focus electrode power supply 16.

Current is conducted through diode D3, Zener diode D2 and resistor R4 establishing a stable operating potential at the cathode of diode D1. This operating potential can be varied by the setting of a potentiometer P3 which is connected across resistor R4. In fact the operating potential at the cathode of diode D1 is adjusted such that it plus the breakdown potential of diode D1 is just below the critical level 11 (FIG. 1) at which moire would occur.

During the tracking mode of operation diode D1 is reverse biased and hence is non-conductive. However, as soon as the focus electrode voltage exceeds the voltage applied to the cathode of diode D1 by the breakdown voltage (normally about one volt) of diode D1, diode D1 will become conductive clamping focus electrode 14 to the voltage at critical point 11, thereby preventing moire from occurring even if there should be a further change in beam current which would tend to increase the voltage applied to focus electrode 14 if the dynamic tracking focus network had not been inhibited by conduction of diode D1.

When the voltage at the slider of potentiometer P1 falls slightly below the voltage at the cathode of diode D1, diode D1 becomes reverse biased again and dynamic tracking focus is restored.

It is important to note that other means for obtaining dynamic tracking focus than those disclosed herein may be used without departing from the instant invention. For example, any system for obtaining dynamic tracking focus wherein the focus electrode voltage is varied responsive to variations in beam current in a direction to focus the electron beam as the beam current varies may be used.

It also should be apparent that the dynamic tracking focus network can be inhibited by systems other than those shown herein.

While a preferred embodiment of this invention has been disclosed herein, those skilled in the art will appreciate that changes in modifications may be made therein without departing from the spirit and scope of this invention as defined in the appended claims.

What is claimed is:

1. In a video signal receiving apparatus of a type having a cathode ray tube with a focus electrode, and means for supplying a DC voltage to said focus electrode, said DC voltage varying in response to changes in the beam current of said cathode ray tube in a direction to maintain the electron beam of said cathode ray tube focused, the improvement comprising means responsive to said DC voltage reaching a critical level where a further increase thereof will result in moire for maintaining said DC voltage below said critical level despite any additional changes in said beam current tending to increase said DC voltage above said critical level.

2. The invention according to claim 1 wherein said cathode ray tube has a high voltage anode, said means for supplying a DC voltage comprising a high voltage power supply, said power supply being connected to said high voltage anode and having a sufficiently high internal impedance that the output voltage thereof varies in response to changes in the beam current of said cathode ray tube, thereby providing said DC voltage for said focus electrode.

3. The invention according to claim 2 wherein said means responsive to said DC voltage comprises a diode having anode and cathode electrodes, means for supplying said DC voltage to said anode and means for supplying to said cathode a DC voltage substantially equal to said DC voltage at said critical level.

4. In a video signal receiving apparatus of a type having a cathode ray tube with a focus electrode and a dynamic tracking focus network for varying the DC voltage supplied to said focus electrode in response to changes in the beam current of said cathode ray tube in a direction to maintain the electron beam of said cathode ray tube focused, the improvement comprising means for inhibiting operation of said dynamic tracking focus network when said DC voltage is about to exceed a critical value beyond which moire will occur and for keeping said DC voltage below said critical value.

* * * * *